United States Patent [19]
Kanna

[11] Patent Number: 5,930,455
[45] Date of Patent: Jul. 27, 1999

[54] AUTOMOBILE FOG CLEARING SYSTEM

[76] Inventor: Ralph Kanna, 850 N. El Camino, San Mateo, Calif. 94401

[21] Appl. No.: 09/104,454

[22] Filed: Jun. 24, 1998

[51] Int. Cl.⁶ .................................................. A61H 33/08
[52] U.S. Cl. .......................................... 392/379; 392/383
[58] Field of Search .................................... 392/379, 383, 392/360, 365, 367; 219/202; 454/901, 93, 115, 117, 121, 125, 126, 162, 163, 161; 126/271.2 A, 271.2 B; 239/14.1; 104/279; 165/41

[56] References Cited

U.S. PATENT DOCUMENTS

| | | | |
|---|---|---|---|
| 1,793,719 | 2/1931 | Reader . | |
| 2,133,927 | 10/1938 | Riel | 219/202 |
| 2,153,900 | 4/1939 | Taber | 126/271.2 A |
| 2,253,671 | 8/1941 | Whitney | 454/161 |
| 2,522,667 | 9/1950 | DeLand | 244/114 |
| 2,802,286 | 8/1957 | Wylie | 126/271.2 A |
| 3,041,748 | 7/1962 | Wetzel | 104/279 |
| 3,196,822 | 7/1965 | Bertin et al. | 454/901 |
| 3,471,681 | 10/1969 | Miller | 392/356 |
| 3,534,907 | 10/1970 | Bellis . | |
| 3,603,507 | 9/1971 | Devlin | 239/14.1 |
| 3,847,137 | 11/1974 | Lambertoni | 126/271.2 A |
| 4,644,452 | 2/1987 | Kasboske | 362/214 |
| 4,991,773 | 2/1991 | Jones . | |
| 5,516,041 | 5/1996 | Davis, Jr. et al. | 236/49.3 |

FOREIGN PATENT DOCUMENTS

| | | | |
|---|---|---|---|
| 1207634 | 2/1960 | France | 454/901 |
| 1468222 | 12/1966 | France . | |
| 2448984 | 10/1980 | France . | |
| 2601860 | 7/1977 | Germany . | |
| 2638699 | 3/1978 | Germany . | |
| 684496 | 12/1952 | United Kingdom | 454/901 |

*Primary Examiner*—Teresa Walberg
*Assistant Examiner*—Quang Van
*Attorney, Agent, or Firm*—Goldstein & Canino

[57] ABSTRACT

A fog clearing system, for clearing fog in front of an automobile, comprising at least one blower mounted in the front of the vehicle. The blower comprises a turbine and an outlet tube. The turbine directs air through the outlet tube, where it is heated by heating coils, and exits the outlet tube at a mouth, wherein a high intensity blast of heated air is directed in front of the automobile. The high intensity blast of heated air serves to clear fog located immediately in front of the automobile.

6 Claims, 2 Drawing Sheets

AUTOMOBILE FOG CLEARING SYSTEM

BACKGROUND OF THE INVENTION

The invention relates to an automobile fog clearing system. More particularly, the invention relates to a system for clearing fog present immediately in front of an automobile.

Poor visibility is one of the most frequent causes of accidents. Whether from rain, snow, darkness, or fog, poor visibility conditions make it impossible to avoid a collision under certain circumstances. The amount of time it takes for a vehicle to stop once the driver sees a dangerous obstacle in the vehicle's path is dependent on the driver's reaction time, and the actual time it takes for the vehicle to stop once braking is initiated by the driver. Unfortunately in circumstances of poor visibility, obstacles suddenly appear without sufficient time to avoid a collision.

Consequently, the best way to prevent a poor visibility related accident is to slow down the vehicle. This is especially effective when traveling during rain and snow conditions, since the slower vehicle speed also allows the vehicle to stop more quickly.

Among the visibility reducing elements, fog is perhaps the most dangerous. Because fog does not interfere with a vehicle's traction, many drivers still proceed at a speed which might be suitable during optimal driving conditions, but which does not leave sufficient time for accident avoidance. Thus, fog can lull the driver into a false sense of security until an obstruction suddenly appears in the road ahead.

In addition, among the visibility reducing elements, fog can tend to have the greatest effect on visibility. Although rain and snow make it difficult to clearly see dark objects, the headlights of oncoming vehicles and tail lights from vehicles ahead can typically penetrate for considerable distances. But, these lights are often unable to penetrate the white haze of a fog.

Often times, the fog is so intense that the driver can not even see one car length in front of his vehicle. Under such circumstances, even traveling at a crawl speed might not leave sufficient time to avoid a low speed collision.

While windshield wipers and headlights work to increase visibility during rain, snow, and in times of darkness, they have absolutely no effect on fog. While these units may be suitable for the particular purpose employed, or for general use, they would not be as suitable for the purposes of the present invention as disclosed hereafter.

SUMMARY OF THE INVENTION

It is an object of the invention to produce a system for helping a driver see the area immediately in front of his vehicle, despite the presence of foggy conditions.

It is another object of the invention to provide a system which clears the fog immediately in front of the vehicle. Accordingly, a pair of heated blowers are provided which direct a high intensity blast of air immediately forward of the vehicle and thereby provide a short distance of visibility in front of the vehicle.

It is a further object of the invention that the heated blowers are mounted in the vehicle grill, just above the bumper, so as to maximize the forward visibility distance created by the hot air blasting therefrom.

The invention is a fog clearing system, for clearing fog in front of an automobile, comprising at least one blower mounted in the front of the vehicle. The blower comprises a turbine and an outlet tube. The turbine directs air through the outlet tube, where it is heated by heating coils, and exits the outlet tube at a mouth, wherein a high intensity blast of heated air is directed in front of the automobile. The high intensity blast of heated air serves to clear fog located immediately in front of the automobile.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
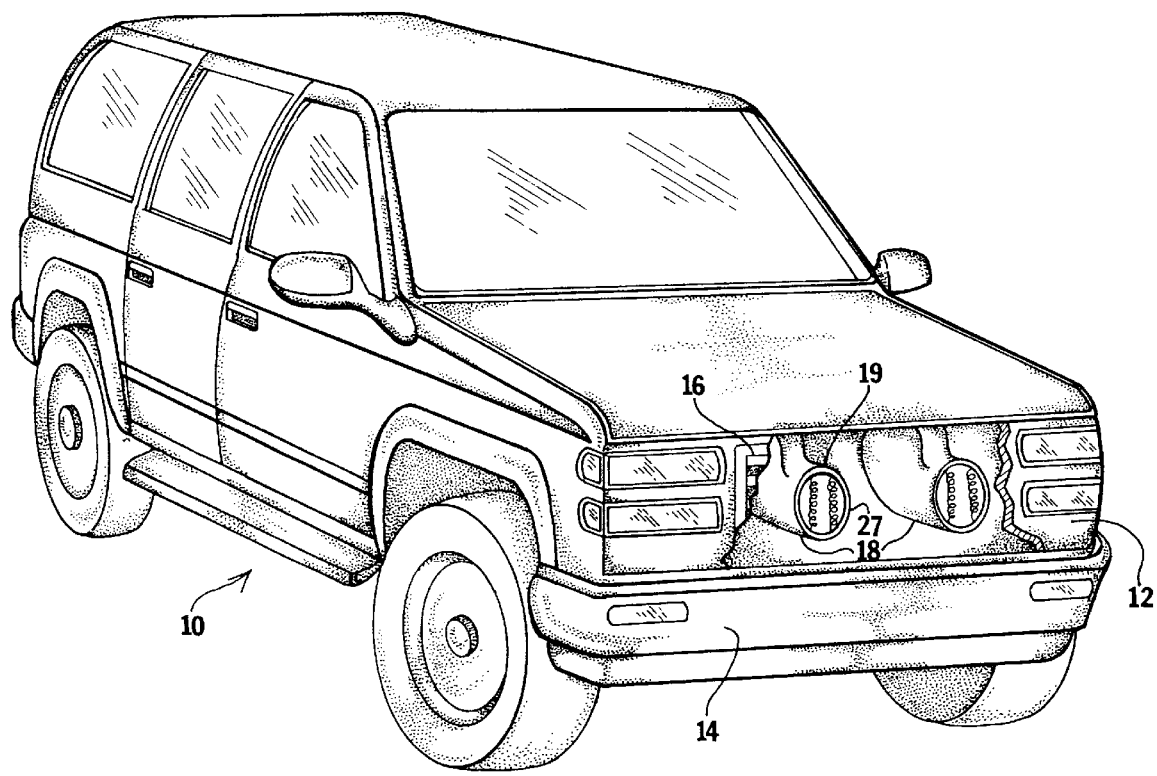
FIG. 1 is a diagrammatic perspective view, illustrating a pair of heated blowers according to the present invention mounted in the front of a vehicle.

FIG. 1 illustrates an automobile 10 having a front 12, including a front bumper 14, and a grill 16 immediately above the front bumper 14. A pair of heated blowers 18 are mounted in the grill 16. The heated blowers 18 have an outlet tube 19. The outlet tube 19 is directed toward the front 12 of the vehicle, for producing a blast of highly directional, hot air directed immediately in front of the vehicle.

The outlet tube 19 may extend through the grill 16 to maximize air flow, or may be hidden immediately behind the grill 16. If the outlet tube 19 is located immediately behind the grill, then air flow is somewhat compromised, but the blowers 18 will not interfere with the appearance, styling, or ornamentality of the automobile 10.

In addition, the number of heated blowers 18 mounted in any particular vehicle may vary. Of course, using only one heated blower 18 will still have some fog clearing ability. In addition, the more heated blowers 18 provided, the greater the fog clearing ability. However, simply a pair of heated blowers 18 is preferable, and they should be spaced apart from each other as much as the vehicle construction permits.

Figure 2:
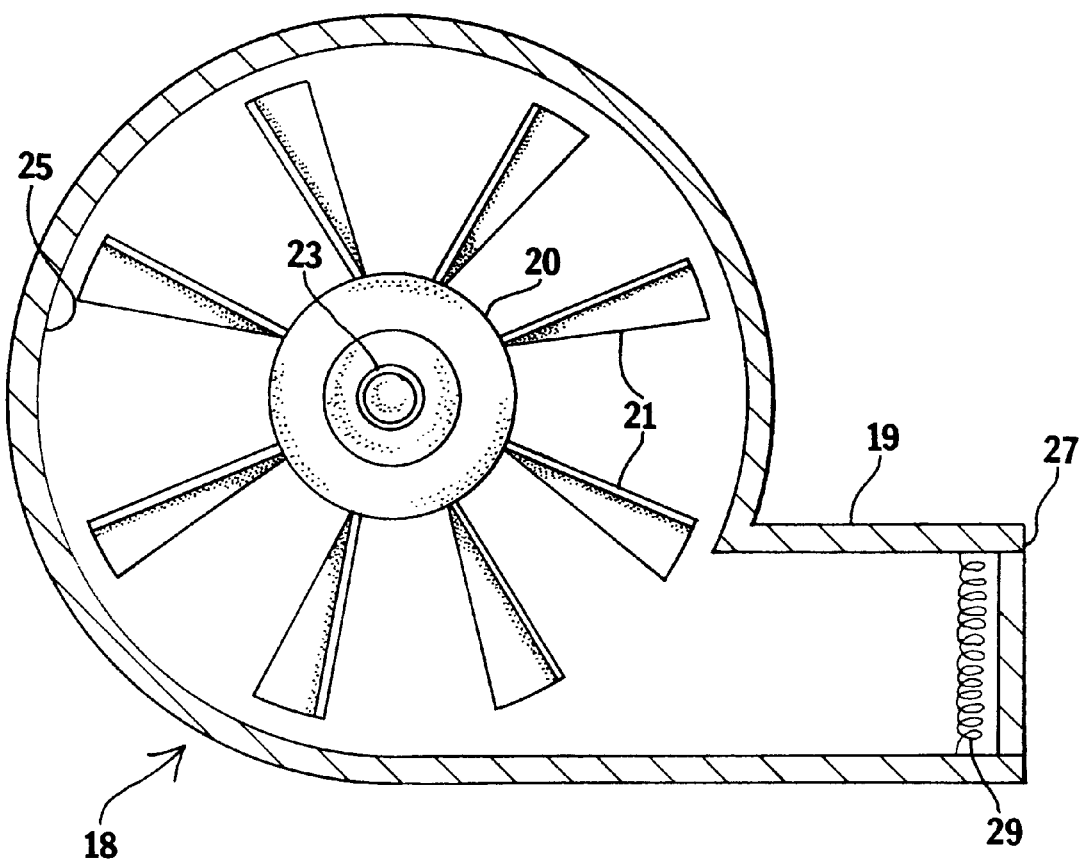
FIG. 2 is a cross sectional view, illustrating one of the heated blowers, per se.

FIG. 2 illustrates one of the blowers 18. The blower 18 comprises a turbine 20 having a plurality of blades 21 rotating around a central axis 23. the turbine 20 is located within a turbine housing 25. The outlet tube 19 extends from the turbine housing 25 so that when the turbine 20 rotates its intended direction of rotation, the blades 21 direct a high intensity blast of air out through the outlet tube 19.

The outlet tube 19 has a mouth 27 where the air leaves the outlet tube 19. Referring momentarily to FIG. 1, the mouth 27 is located at the grill 16 of the automobile 10. Before the air leaves the outlet tube 19, it first encounters heating coils 29 located just before the mouth 27. The heating coils increase the temperature of the air, so that the air leaving the mouth 27 is a high intensity blast of heated air.

With regard to a power source for operating the blowers 18, the turbines 20 may each by driven by an electric motor, or may be belt driven by the vehicle engine so that the turbines 20 are more efficiently driven using the engine power. Driving the turbines 20 with the engine makes further sense, since the air outlet intensity will then be proportional with the engine speed. Since the engine speed generally follows the vehicle speed, a higher intensity air blast is thereby provided to accommodate the greater vehicle speed and thus the greater need for visibility in front of the vehicle.

With regard to the source of heat for the heating coils 29, electrical heating elements may be employed which are high resistance wires which become heated when electric current passes through them. However, the heating coils may also be coiled tubing which circulate heated fluid from the vehicle engine. Using engine heat is probably more efficient than the use of electric heat. After all, the heat from the engine must be dissipated therefrom regardless, thus it makes sense to utilize this heat in producing the high intensity air blast which aids in clearing the fog.

In conclusion, herein is presented a fog clearing system which mounts in the front of an automobile, and directs a high intensity heated air blast forward of the vehicle, to clear fog present immediately in front of the automobile.

What is claimed is:

1. A fog clearing system in combination with a passenger an automobile having a front having a bumper and a grill, said automobile traveling upon a road surface, comprising:
at least one blower located at the front of the automobile, the blower having an outlet tube and heating coils located near the outlet tube, the outlet tube directing a highly directional heated high intensity air from the blower in front of the vehicle, parallel to the road surface.

2. The fog clearing system as recited in claim 1, comprising two blowers mounted at the grill.

3. The fog clearing system as recited in claim 2, wherein the blower comprises a turbine contained within a tubing housing, the outlet tube extending from the turbine housing, the outlet tube having a mouth with is located at the grill.

4. The fog clearing system as recited in claim 3, wherein the outlet tube of each blower is located immediately behind the grill.

5. A fog clearing method, for clearing fog present immediately in front of a vehicle, traveling upon a road surface, using a blower mounted at the front of the vehicle, comprising the step of:
directing a blast of high intensity air in front of the vehicle.

6. The fog clearing method as recited in claim 5, wherein the blower further comprises an outlet tube having heating coils for heating air passing therethrough, and wherein the step of directing the blast of high intensity air is preceded by heating the air with the heating coils.

\* \* \* \* \*